Nov. 11, 1941.  W. BELSHAW  2,262,485

DOUGH FORMER

Filed July 25, 1938  2 Sheets-Sheet 1

INVENTOR.
Walter Belshaw
Paul Bliven
ATTORNEY.

Nov. 11, 1941.   W. BELSHAW   2,262,485
DOUGH FORMER
Filed July 25, 1938   2 Sheets-Sheet 2

INVENTOR.
Walter Belshaw
BY   Paul Bliven
ATTORNEY.

Patented Nov. 11, 1941

2,262,485

UNITED STATES PATENT OFFICE 2,262,485

DOUGH FORMER

Walter Belshaw, Seattle, Wash.

Application July 25, 1938, Serial No. 221,148

18 Claims. (Cl. 107—14)

The present invention relates to a dough former, in particular to a machine for forming a fancy pastry such as a "French doughnut."

At the present time French doughnuts are formed by hand with the aid of a collapsible bag and by skillful manipulation of the hand as the dough is extruded from the bag.

The present invention is an improvement over the machine shown in applicant's prior Patent Number 1,738,033, whereby a machine of that type may be operated to form French doughnuts.

Having in mind the lack of a machine for making French doughnuts, it is an object of the present invention to devise a machine for forming such doughnuts.

It is an object of the present invention to extrude a ring of dough and to give to the ring a twisted and ribbed effect.

It is an object of the invention to provide a dough former provided with a plurality of dispensing orifices.

It is an object of the present invention to provide a dough former with a piston which has a skirt with one or more openings for shaping dough as it is forced through these openings.

It is an object of the invention to provide a supercharging means for insuring that full quantities of dough will be available for dispensing.

These objects and others are attained by a modification of the machine shown in applicant's previous patent mentioned above. This device and its modifications comprises in essence: a hopper, attached to the lower end of the hopper a cylinder, a piston with perforated skirt in the lower end of the cylinder, skirt up, another piston in the upper end of the cylinder, and suitable cams and links for operating the pistons. The operation is such that with dough in the hopper, the pistons will confine a quantity of dough between them, the lower and skirted piston will move out of the cylinder a distance that will expose the perforations in its skirt, and the upper piston will cause the dough to be extruded through the perforations.

The construction and operation of such a machine will be better understood by considering the following description in connection with the accompanying drawings, in which.

Figure 1:
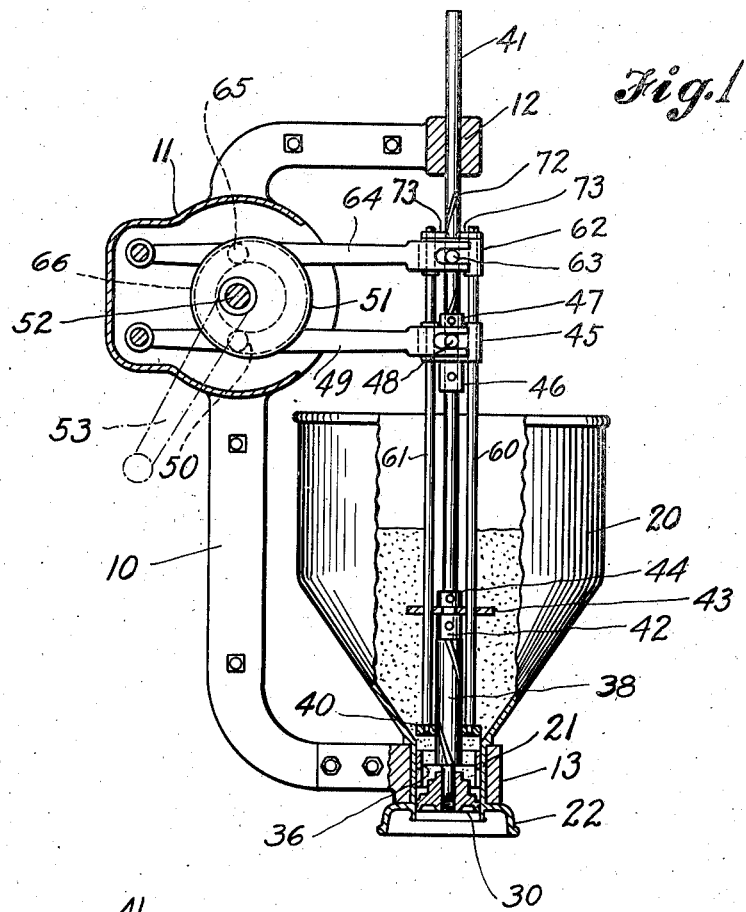
Figure 1 is an assembly view with partial section of a dough former embodying my invention.

Figure 1: A vertically situated frame 10 is formed with a cam case 11 at its middle portion, a vertically journaled bearing 12 at its upper end, and a hopper holding ring 13 at its lower end.

A dough hopper 20 is supported in the ring 13. The lower end of the hopper has attached to it a cylinder 21 as a continuation of the hopper. This cylinder is placed in the ring 13. On the lower end of the cylinder is a skirt 22 flared outwardly and downwardly.

Figure 2:
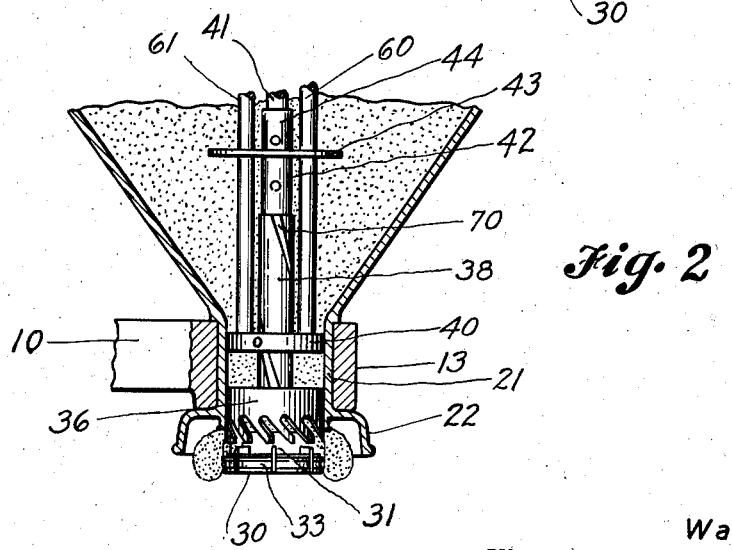
Figure 2 is an enlarged section view of the dispensing cylinder shown in Figure 1.
Figure 3:
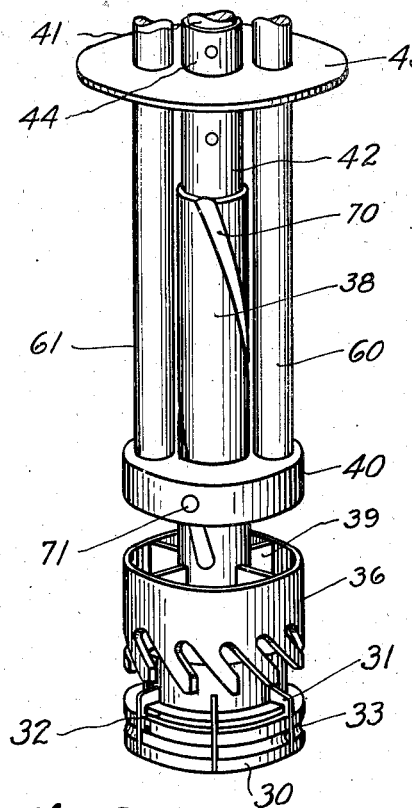
Figure 3 is a view of the piston assembly and the lower parts of the piston rods, shown in Figure 1.
Figure 4:
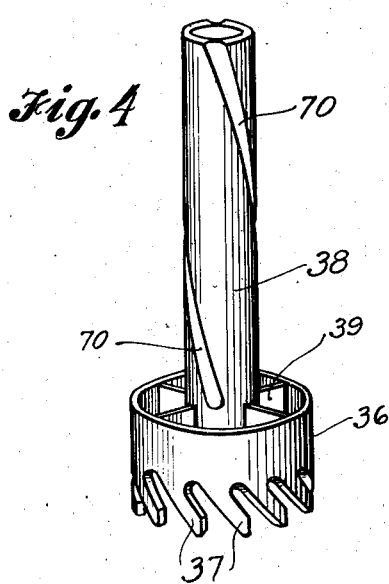
Figure 4 is a view of the skirt of the lower piston shown in Figure 3.
Figure 5:
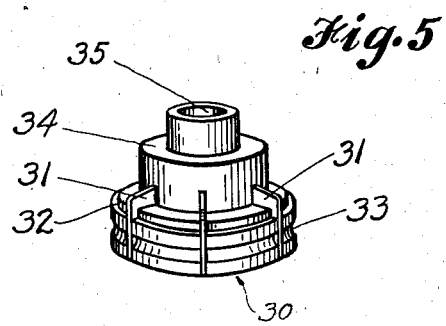
Figure 5 is a view of the head of the lower piston shown in Figure 3.

Figures 2, 4 and 5: In the cylinder 21 is a lower piston having a head 30, or lower member. The head has formed with it on its upper surface, vertical baffles 31; on its top edge, or corner, is an annular step 32; in its side face an annular sealing groove 33; on the top side a fairing, or guide, member 34; and in the center of the head is a tapped hole 35.

Spaced above the head 30 by an annular slot is a skirt 36, or upper member. The skirt has in its lower edge downwardly and diagonally extending fingers 37, which form between themselves diagonal slots. The ends of the fingers are spaced from the head. The skirt is fastened to a sleeve 38 by means of a plurality of vertical baffle plates 39. The sleeve 38 resting on the head 30 spaces the skirt and head apart.

The lower piston comprising the head and skirt is actuated to move to and fro in the cylinder. The head of the piston will move downwardly a distance sufficient to bring the fingers below the lower edge of the cylinder. When in this position dough is extruded through the opening or openings formed between the skirt and the head and between the fingers. While dough is being extruded, the head and skirt are caused to rotate in opposite directions. The fingers cause the surface of the dough to be ribbed or fluted, and the rotation of the head and skirt gives the ribs a helical shape. Movement of the piston back into the cylinder cuts off a section of the dough. The step 32 on the upper edge of the head causes the dough mass to cling and roll on the piston instead of leaving it; thus practically the entire surface of the dough mass is ribbed. The guide 34 increases the pressure of the dough on the spaces between the fingers relative to the pressure on the space below the fingers. By varying the size and shape of this guide a means is had of controlling the relative quantities of dough that are extruded through the spaces between the fingers and the space below the fingers. This control affects the depth of the ribbing on the finished product. If this device is used for forming a doughnut ring, the product has the appearance of a French doughnut.

Also traveling in the cylinder 21 is the upper piston 40.

The upper piston moves out of the cylinder into the dough mass in the hopper. While the upper piston is in the hopper, the lower piston will suck dough out of the hopper and down into the cylinder. This movement of the dough will be aided by a downward movement of the upper piston through the dough mass. As the upper piston enters the cylinder there will be trapped between the two pistons a definite quantity of dough. This dough will be carried down through the cylinder by movement of the two pistons. When the dispensing openings in the side of the lower piston are uncovered, the upper piston continues its movement toward the lower piston. This causes the dough to be extruded through the openings in the side of the lower piston.

Figure 1: The lower piston is reciprocated by means of a piston rod 41 that is threaded on its lower end and is in threaded engagement with the head of the lower piston. The rod extends up through the sleeve 38, and has a collar 42 secured to it which rests on the upper end of the sleeve and thus prevents movement of the sleeve therealong. The sleeve 38 is free to rotate on the rod. Above the collar 42 is a round supercharging plate 43, and above the plate another collar 44 which holds the plate against the lower collar 42. Movement of the plate up and down aids in maintaining pressure on the dough in the lower end of the hopper and in filling the space between the two pistons.

About midway of the piston rod is a lower block 45 secured from movement along the rod by collars 46 and 47. On each side of the block is a pin 48. The upper end of the rod is journaled in the bearing 12 secured to the frame 10. The pins 48 are engaged by the forked end of a lever 49. The other end of the lever is pivoted in the cam housing 11. Midway of the lever 39 is a cam follower 50, or roller. This roller is engaged by a cam 51. The cam is fastened on a shaft 52 journaled in the cam housing 11. The cam is actuated by means of a crank 53 secured on one end of the shaft 52. The cam 51 is given a shape which will impart to the lower piston the desired reciprocating movement, as is herein and in my previous patent set forth.

The upper piston is reciprocated by means of a pair of piston rods 60 and 61. These rods are secured at their lower ends to the upper piston, and are placed on diametrically opposite sides of the piston. These rods pass loosely through the supercharging plate 43 and the lower piston rod block 45. Above this lower block 45 these rods are secured to an upper block 62. On each side of this block are secured pins 63 similar to the pins on the lower block. These pins are engaged by the forked end of a lever 64. The other end of the lever is pivoted in the cam housing 11. Midway of the lever 64 is mounted a cam follower 65, or roller. This roller is engaged by a cam 66. The cam is secured to the shaft 52 journaled in the cam housing 11, and is actuated by the crank 53. This cam is given a shape which will impart to the upper piston the desired movement as is herein and in my previous patent set forth.

Rotational movement of the skirt of the lower piston is obtained by forming in the sleeve attached to the skirt one or more helical grooves 70, and engaging in each groove a detent 71 secured in the upper piston. Thus relative movement between the two pistons will cause the skirt to rotate as the detents, restrained from rotational movement by the upper piston, follow in the helical grooves.

Rotational movement of the head of the lower piston is obtained by forming in the lower piston rod 41 adjacent the upper block 62, one or more helical grooves 72, and engaging in each of the grooves a detent 73. It is to be noted that the lower helices 70 are opposite in direction from the upper helices 72, that is, one is right and the other is left-handed. These detents 73 are secured on top of and to the upper block 62. Relative movement between the two pistons will cause the head to rotate as the detents, restrained from rotation by the block 62, follow in the helical grooves.

It is to be noted that all the rotational forces in the piston and piston rod assembly are taken up in the assembly. There is no tendency for the assembly to rotate.

With the above-described mechanisms in place the hopper full of dough, and the crank being rotated, the lower piston will suck dough into the cylinder, the upper piston will cut off a section of the dough, and the pistons will carry the section of dough through the cylinder. When the openings in the side wall, or skirt, of the lower piston are below the lower end of the cylinder, the upper piston will move toward the lower piston and cause a transversely ribbed ring of dough to be extruded. This dough will be ribbed over practically all of its surface, due to the rolling action of the dough on the head. The fact that the dough clings and rolls on the head is largely due to the step in the upper edge of the head. The ribs are given a helical shape by relative rotation of the head and skirt. This is done through the agency of the helical grooves on the sleeve attached to the head, and the grooves in the upper portion of the lower piston rod, with the cooperation of the detents located in the grooves.

The baffle plates 31 and 39 cause the dough to be moved by the rotation of the head and skirt. If the device is operated at a low speed it is not necessary that both members of the lower piston rotate. However, at high speeds the centrifugal force imparted to the dough by the rapid rotation necessary if the skirt alone moves, causes the dough to leave the head, and prevents the formation of a ring round in cross section. It is, of course, obvious that other mechansms than those shown may be used for reciprocating the pistons and for rotating the head and skirt of the lower piston. As modifications it might be mentioned that the upper piston could be eliminated if the dough were put under air pressure by sealing in the top of the hopper and pumping in air. The lower piston could be fixed and a sleeve moved to open and close the openings in the skirt. The skirt and the head could be rotated by means of gearing instead of the helical grooves. By having the cylinder extended on one side and not on the other, so that only part of the openings in the skirt are uncovered, strips or bars having a wavy ribbed surface may be extruded.

Figure 6:
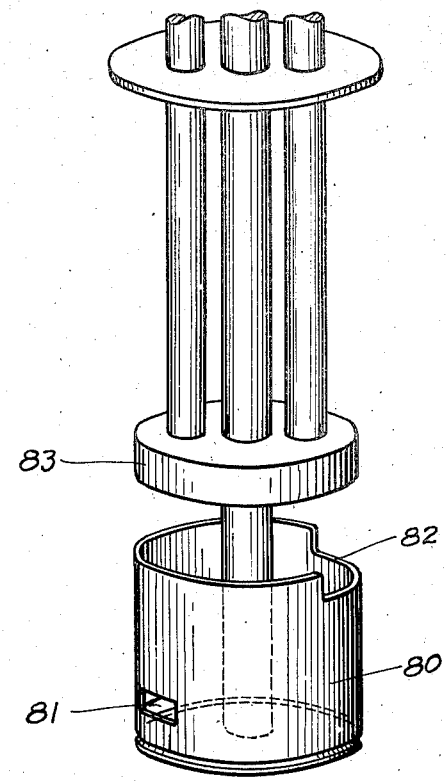
Figure 6 is a view of a modified piston assembly.

Figure 6 shows a modified piston assembly that may be substituted for the assembly shown in Figure 1. This assembly will make strips of pastry such as strip doughnuts.

The lower piston 80 is formed with integral head and skirt. The skirt is formed with a dispensing opening or openings 81 in its side adjacent to the head. Opposite this opening and at or near the top of the skirt is a relieving opening 82. Above the lower piston is an upper piston 83. The reciprocating movement of the two pistons is similar to that previously described for the pistons shown in Figure 1, and the related mechanisms may be the same.

Operation of a machine having this piston assembly will produce either short sticks or rolls, depending upon the amount of dough extruded at each uncovering of the opening. For the formation of rolls, a step in the lower edge of the opening causes the dough to cling to the piston and to roll on itself. The relieving opening 82 compensates for the dispensing opening 81, it prevents binding of the piston due to the pressure of the piston away from the dispensing opening.

Having thus described the invention, I claim:

1. In a dough machine: opposed members forming an orifice of fixed size; and means for opening and closing said orifice, and for moving one of said members relative to the other.

2. In a dough machine: means forming an orifice for the delivery of dough, means for uncovering said orifice, and means for moving part of the edge of said orifice relative to another part of the edge.

3. In a dough machine: superposed members forming an orifice therebetween, the lower of said members having a step formed in it adjacent and outwardly of said orifice, and means for extruding dough through said orifice.

4. In a dough machine: superposed members forming an orifice therebetween, the lower of said members having a step formed in it adjacent said orifice and along all of its orifice forming portion and outwardly thereof, and means for opening and closing said orifice.

5. In a dough machine: opposed members forming an orifice, means for opening and closing said orifice, and means for moving both of said members relative to each other.

6. In a dough machine: a piston head, a piston skirt, said head and skirt being separated along their periphery, and fingers formed in the edge of said skirt opposite said head.

7. In a dough machine: a piston head, a piston skirt, said head and skirt being separated along their periphery, fingers formed in the edge of said skirt opposite said head, and means for rotating said head relative to said skirt.

8. In a dough machine: a dough holding hopper, a piston in and widely spaced from the walls of said hopper, and means for reciprocating said piston in said hopper only.

9. In a dough machine: a dough holding hopper, a cylinder attached to the lower end of said hopper, and a plurality of pistons arranged for downward movement through the hopper above said cylinder.

10. In a dough machine: having upper and lower pistons adapted to be actuated to dispense dough, the construction of the lower piston, comprising: a lower member forming the head of the piston, an upper member spaced along its periphery from said head and forming the skirt of said piston, and camming means associated with said members to rotate said members in opposite directions; said upper member being upwardly and diagonally slotted from its lower edge, and forming interiorly thereof a passageway for dough, the volume of said passageway being reduced in passing said slots and the space between said members, said lower member having baffles projecting into said passageway, and having annular grooves adjacent the opening between said members.

11. In a dough dispensing machine having a dough hopper, a pair of upper and lower pistons for dispensing charges of dough from said hopper, and means for actuating said pistons, the combination of: upper and lower members forming said lower piston, said members being movable about their longitudinal axes, camming means attached to each of said members, and means for actuating said camming means, said camming means being so constructed that both of said members will move about their longitudinal axes relative to each other.

12. In a dough dispensing machine having a dough hopper, a pair of upper and lower pistons for dispensing charges of dough from said hopper, and means for actuating said pistons, the combination of: upper and lower members forming said lower piston, the lower member forming the head of said piston, a rod supporting said lower member, and camming means attached to said rod and acting to rotate said lower section when said rod is given longitudinal movement relative to said upper piston, the upper section of said piston forming the skirt thereof and being spaced from the lower section along its periphery, a sleeve mounted for rotation only on said rod and attached to said upper portion, and camming means attached to said sleeve and adapted to rotate said sleeve about its axis when said lower piston is given longitudinal movement relative to said upper piston, the rotation of said upper and lower sections being opposite in direction.

13. In a dough machine: opposed members forming an orifice of fixed size having a serrated edge; and means for opening and closing said orifice, and for moving one of said members relative to the other.

14. A dough machine having an orifice with a serrated edge and means on the outside of said orifice for closing it.

15. A dough machine having an orifice with a serrated edge, means on the outside of said orifice for closing it, and means for moving parts of said orifice relative to each other.

16. A dough machine having an orifice with a portion of the edge thereof serrated, the centerlines of said serrations being at an acute angle to the edge of said orifice, and means for opening and closing said orifice.

17. A dough machine having an orifice with a portion of the edge thereof slotted at an acute angle thereto, and means for moving parts of said orifice and said slotted portion relative to each other.

18. In a dough machine: a piston head, and a piston skirt having an opening therethru adjacent said head and another removed from said head and diametrically opposite said first opening.

WALTER BELSHAW.